United States Patent [19]
Fujinami et al.

[11] Patent Number: 5,521,922
[45] Date of Patent: May 28, 1996

[54] DATA DEMULTIPLEXER

[75] Inventors: Yasushi Fujinami, Kanagawa; Markus H. Veltman, Tokyo, both of Japan

[73] Assignee: Sony Corporation, Tokyo, Japan

[21] Appl. No.: 245,768

[22] Filed: May 18, 1994

[30] Foreign Application Priority Data

May 25, 1993 [JP] Japan .................... 5-122269

[51] Int. Cl.$^6$ ....................................... H04J 3/06
[52] U.S. Cl. ................... 370/84; 370/100.1; 370/112; 348/423; 352/12; 352/25
[58] Field of Search ................... 370/84, 100.1, 370/105.1, 105.4, 105.5, 112; 348/17, 423, 466, 467; 352/12, 14, 15, 16, 17, 19, 20, 21, 22, 23, 24, 25; 379/93, 96

[56] References Cited

U.S. PATENT DOCUMENTS

| | | | |
|---|---|---|---|
| 3,898,376 | 8/1975 | Nabeyama et al. | 370/100.1 X |
| 5,231,492 | 7/1993 | Dangi et al. | 348/15 X |
| 5,262,964 | 11/1993 | Bonsall et al. | 370/94.2 X |
| 5,287,182 | 2/1994 | Haskell et al. | 348/500 |
| 5,291,486 | 3/1994 | Koyanagi | 370/112 X |

FOREIGN PATENT DOCUMENTS

| | | | |
|---|---|---|---|
| 0245904A1 | 11/1987 | European Pat. Off. | H04N 1/21 |
| 0460751A2 | 12/1991 | European Pat. Off. | H04N 5/92 |
| 522853A3 | 1/1993 | European Pat. Off. | H04N 5/92 |
| 0577329A2 | 1/1994 | European Pat. Off. | H04N 7/13 |
| 4345271A1 | 5/1994 | Germany | H04N 5/92 |
| 2259229 | 3/1993 | United Kingdom | H04J 3/22 |

OTHER PUBLICATIONS

Macinnis, A., "The MPEG systems coding specification", Signal Processing: Image Communication, vol. 4, No. 2; (Amsterdam, NL: Apr. 1992); pp. 153–159.

International Standards Organisation, 20 Apr. 1992, Tokyo, "Coding of Moving Pictures and Associated Audio for Digital Storage Media at up to About 1.5 Mbits/s, Part 1, Systems".

*Primary Examiner*—Douglas W. Olms
*Assistant Examiner*—Russell W. Blum
*Attorney, Agent, or Firm*—William S. Frommer; Alvin Sinderbrand

[57] ABSTRACT

A data demultiplexer for separating multiplex data including at least coded video data, coded audio data, timing data indicative of a video decoding start time, timing data indicative of an audio decoding start time, and timing data indicative of a system clock reference time. The demultiplexer comprises a circuit for separating the multiplex data into the component data, and comparators for comparing input data with the reference timing data. When the timing data indicative of a video decoding start time is inputted and detected, the video data is written in a video code buffer at the maximum transfer rate. During such time period, the reference timing data indicative of the current time is monitored, and the operation of decoding the video data is started when the reference timing data has become equal to the video timing data. A similar operation is performed with regard to the audio data as well, so that the video and audio data can be inputted fast to consequently enhance the responsivity at the start of reproduction.

16 Claims, 11 Drawing Sheets

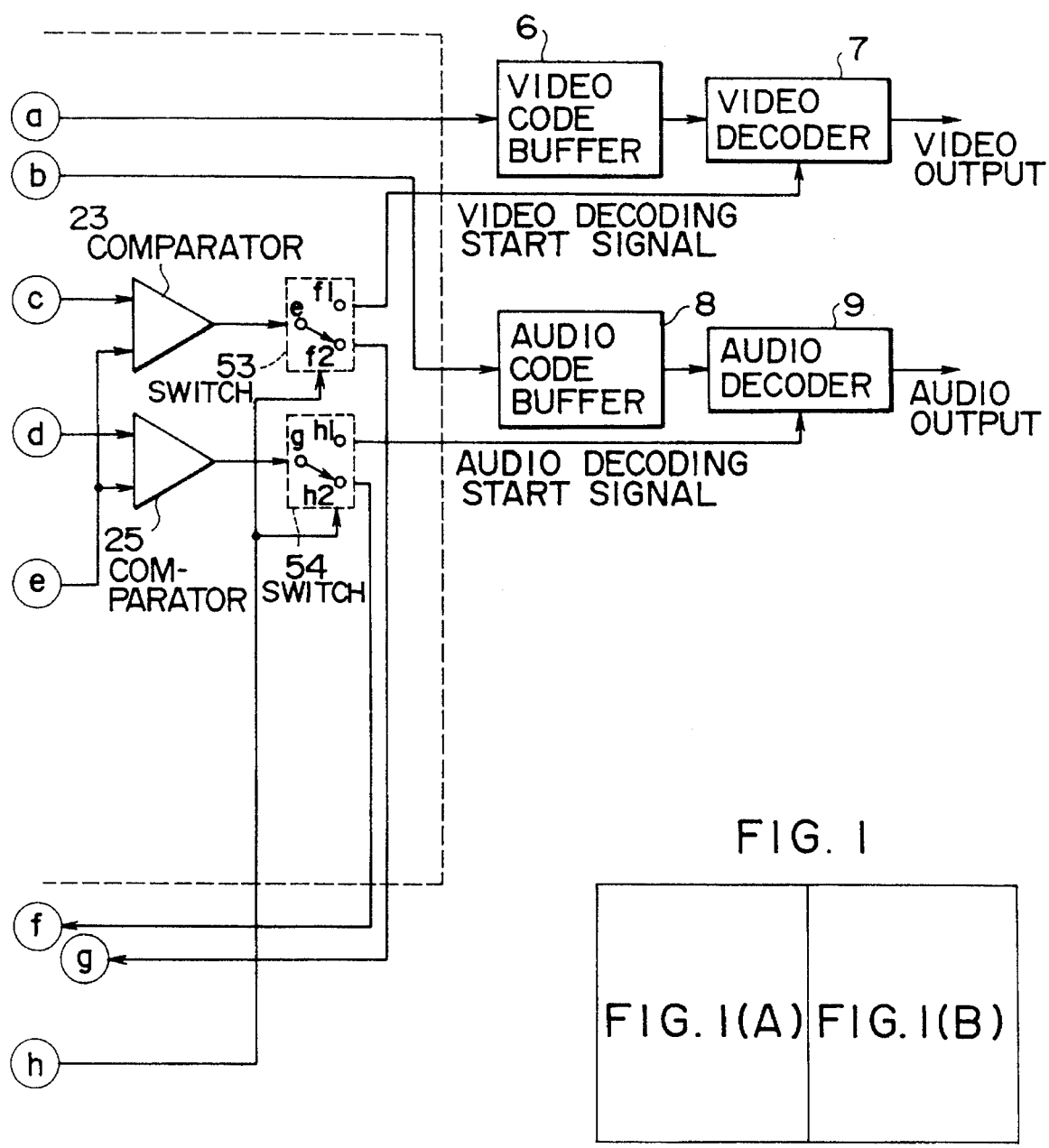

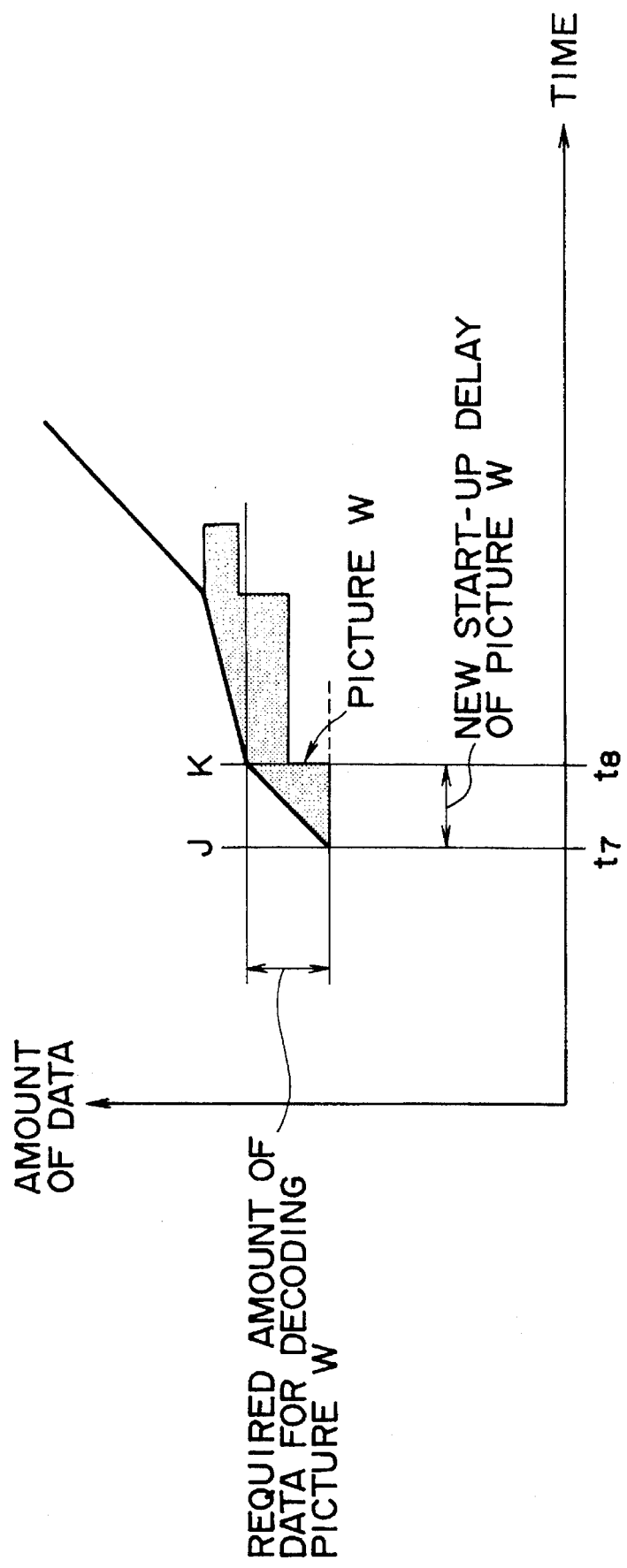

FIG. 4(B)
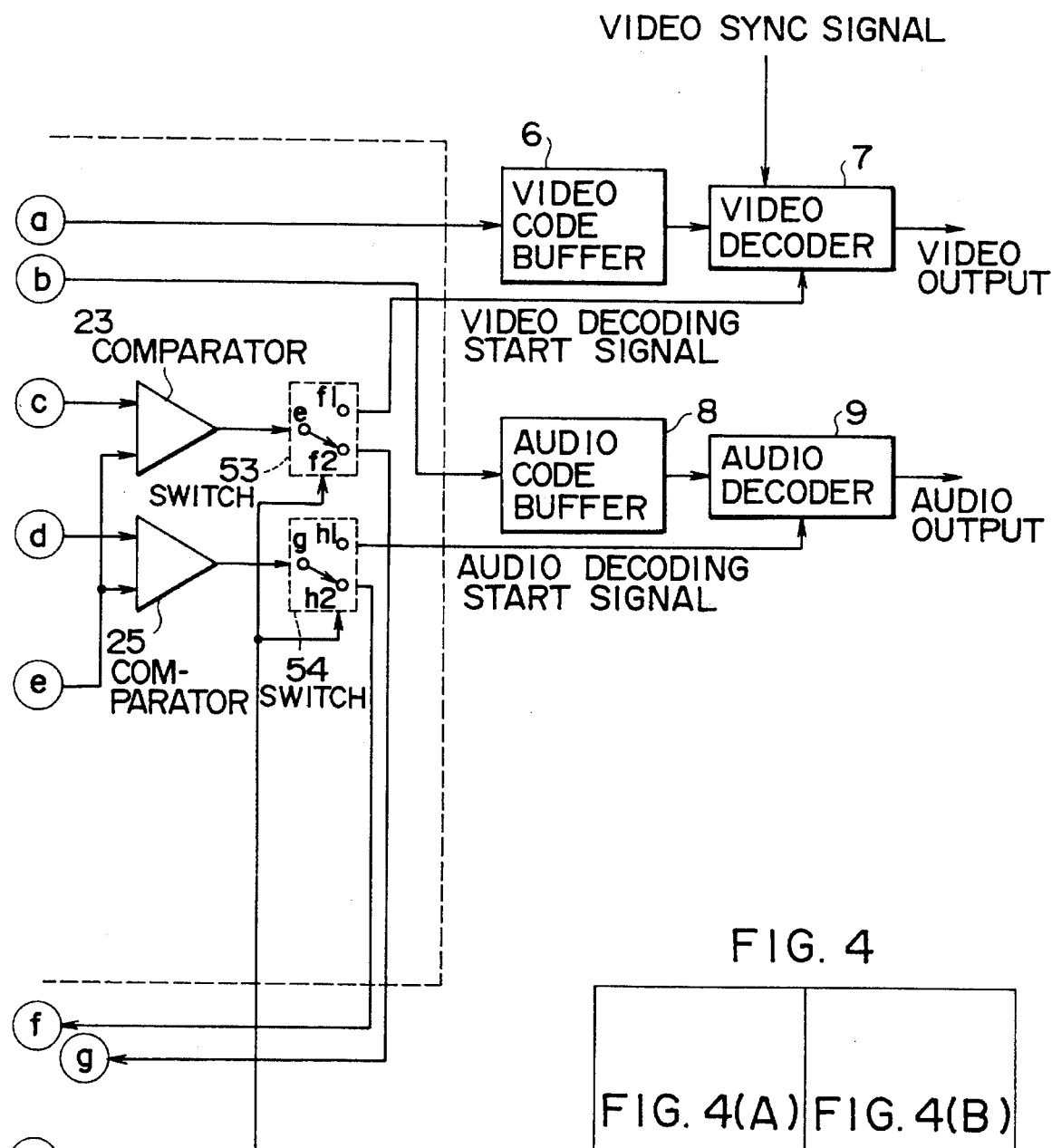
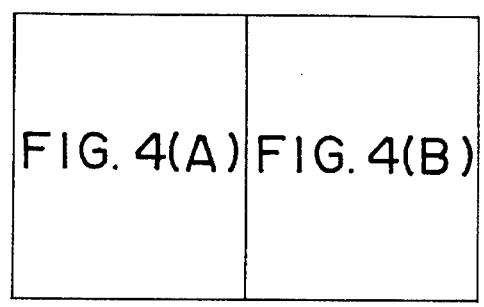

FIG. 8
(PRIOR ART)
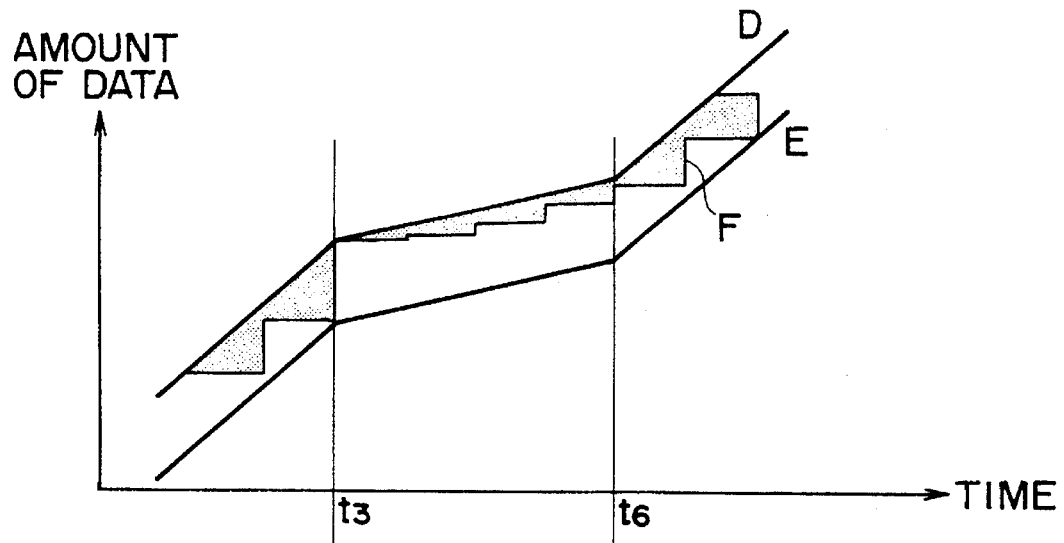
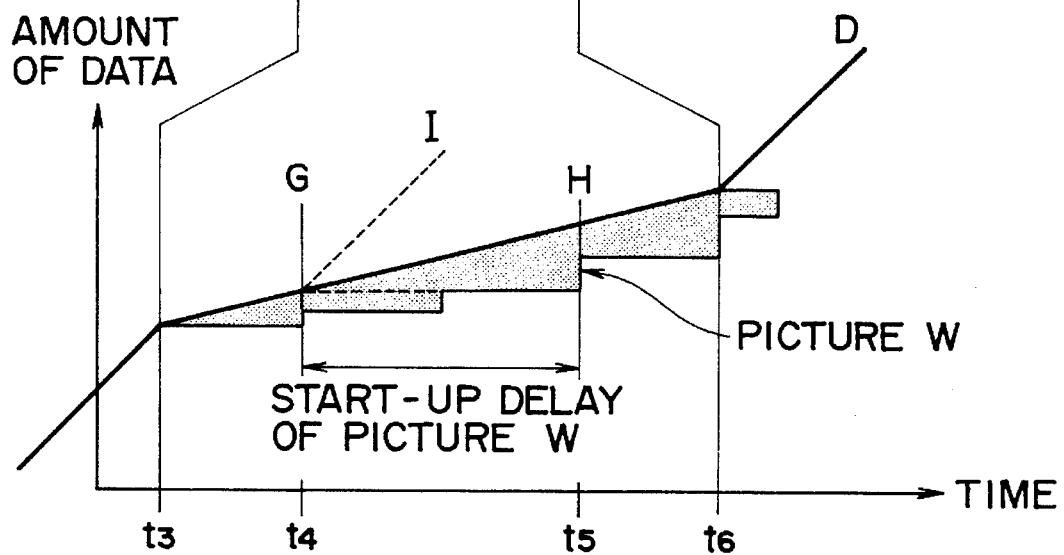

5,521,922

DATA DEMULTIPLEXER

BACKGROUND OF THE INVENTION

The present invention relates to a data demultiplexer adapted for reproducing time-division multiplex data recorded on an optical disk or the like and separating the same into video data and audio data.

FIG. 5 is a block diagram showing an exemplary constitution of a conventional data demultiplexer known heretofore. In this diagram, a drive 1 reproduces the data recorded on an optical disk incorporated therein. On this optical disk, there are recorded both video data and audio data in a time-division multiplex form. The reproduced data outputted from the drive 1 is supplied to a demodulator 2 so as to be demodulated. An ECC circuit 3 detects and corrects any error in the data outputted from the demodulator 2 and supplies the processed data to a ring buffer 4. Then the ring buffer 4 stores a predetermined amount of the supplied data therein and subsequently outputs the data to a data demultiplexer 5.

The data demultiplexer 5 has a data separation circuit 21 which demultiplexes the data supplied from the ring buffer 4 to thereby separate the same into video data and audio data, and further into timing data such as SCR (system clock reference) and DTS (decoding time stamp) inclusive of DTSV for the video data and DTSA for the audio data.

The format of the data supplied to the data demultiplexer 5 is so standardized as shown in FIG. 6 for example. This format is prescribed as a multiplex bit stream in the MPEG (ISO11172). As shown in FIG. 6, a multiplex bit stream is composed of one or more packs (PACKS), each of which is composed of one or more packets (PACKETS). A pack header (PACK HEADER) is disposed at the top of each pack and has a pack start code (PACK START CODE) indicating a start point of the pack, and also SCR and MUX_RATE. This SCR indicates the time when the last byte is inputted to the data demultiplexer 5 (the time when demultiplexing is started), and the MUX_RATE signifies a transfer rate.

In the example of FIG. 6, a video packet (VIDEO PACKET) and an audio packet (AUDIO PACKET) are disposed next to the pack header. A packet header is disposed at the top of each of such packets and has a video packet start code (VIDEO PACKET START CODE) or an audio packet start code (AUDIO PACKET START CODE) indicating a start point of the video or audio packet, and further has DTSV or DTSA indicating a decoding start time of the video or audio data. Video data or audio data is disposed next to each packet header. However, since the amount of video data per unit time is greater than that of audio data, video timing data DTSV is disposed at a rate of once per plural packs.

Such timing data of SCR and DTS (DTSV or DTSA) are represented by count values of 90-kHz clock pulses and have 33-bit effective digits.

The video data is supplied to a video code buffer 6 (FIFO). Meanwhile the audio data is supplied to an audio code buffer 8 (FIFO). The reference timing data SCR is supplied to an STC register 26 to be stored therein. The STC register 26 counts 90-kHz clock pulses outputted from a clock generator 27 and increments its storage value to generate an STC (system time clock) signal.

The timing data DTSV and DTSA are supplied to a DTSV register 22 and a DTSA register 24 respectively so as to be stored therein. The timing data thus stored in the DTSV register 22 and the DTSA register 24 are supplied to comparators 23 and 25 respectively so as to be compared with the STC signal outputted from the STC register 26. A control circuit 28 consists of a CPU or the like and serves to control the data separation circuit 21 in response to a command received from an input unit 29 by a user's manipulation.

The video data stored in the video code buffer 6 is read out therefrom and is supplied to a video decoder 7. Then, the video data is decoded to become a video signal, which is subsequently outputted to an unshown circuit. To the video decoder 7, there is also supplied a video decoding start signal which is outputted from the comparator 23.

Similarly, the data outputted from the audio code buffer 8 is supplied to an audio decoder 9 so as to be decoded. To the audio decoder 9, there is also supplied the output of the comparator 25 as an audio decoding start signal.

Now the operation will be described below with reference to a timing chart of FIG. 7. First, the input unit 29 is manipulated for instructing the control circuit 28 to start reproduction. Then, the control circuit 28 sends a command to the drive 1 to thereby reproduce the data recorded on an optical disk incorporated in the drive 1. The reproduced data outputted from the drive 1 is supplied to the demodulator 2, and the demodulated data obtained therefrom is supplied to the ECC circuit 3 where a process of error detection and correction is executed. The data thus processed is supplied via the ring buffer 4 to the data separation circuit 21 in the data demultiplexer 5.

The data separation circuit 21 is controlled by the control circuit 28 and separates the output data of the ring buffer 4 into video data and audio data, which are then supplied to the video code buffer 6 and the audio code buffer 8, respectively. The circuit 21 further separates the timing data into SCR, DTSV and DTSA, which are supplied respectively to the STC register 26, the DTSV register 22 and the DTSA register 24 and then are stored therein.

The STC register 26 having stored the timing data SCR therein counts the clock pulses outputted from the clock generator 27 and increments the storage value in response to the clock pulses. The storage value of the STC register 26 is supplied as a system time clock (STC) signal to the comparators 23 and 25.

The DTSV register 22 holds the video timing data DTSV supplied first thereto after the start of reproduction by the drive 1. Consequently, the register 22 has a decoding start time relative to a top picture out of the entire data stored in the video code buffer 6.

Similarly, the DTSA register 24 holds the audio timing data DTSA supplied first thereto after the start of reproduction, so that the register 24 has a decoding start time relative to a top decode unit out of the entire data stored in the audio code buffer 8.

The reference timing data SCR corresponds to the time when demultiplexing is started after supply of the data from the ring buffer 4 to the data demultiplexer 5. More specifically, it corresponds to a time t1 in the timing chart of FIG. 7. Therefore the STC register 26 outputs the time data (current time) from the time t1 to one input terminal of each of the comparators 23 and 25.

The DTSV register 22 supplies the video timing data DTSV, which indicates the decoding start time of the video decoder 7, to the other input terminal of the comparator 23. When the current time outputted from the STC register 26 has become coincident with the decoding start time outputted from the DTSV register 22 (i.e., at a time t2 in FIG. 7), the comparator 23 outputs a video decoding start signal to the video decoder 7. In response to the video decoding start signal thus received, the video decoder 7 reads out one frame of the video data written in the video code buffer 6 and then starts its decoding.

In FIG. 7, a straight line A represents a state of writing the data in the video code buffer 6 (with an inclination signifying a write and transfer rate), and a line B represents a state of reading out the data from the video code buffer 6 by the video decoder 7. It follows, therefore, that the data within a shaded area in FIG. 7 is left in the video code buffer 6. The storage capacity of the video code buffer 6 is expressed by a distance perpendicular to the time axis extending from line A to a line C.

The video decoder 7 starts its decoding in response to the video decoding start signal supplied thereto and generates a video vertical synchronizing signal upon completion of the decoding, i.e., after a lapse of a video decode delay (VIDEO-DECODE-DELAY) from the start of the decoding, and then outputs a video signal in succession thereto. More specifically, a display is started after a lapse of the video decode delay from the start of the decoding.

Similarly, the comparator 25 outputs an audio decoding start signal when the current time outputted from the STC register 26 has become coincident with the audio decoding start time outputted from the DTSA register 24. The audio decoder 9 reads out the data from the audio code buffer 8 in response to the audio decoding start signal and starts its decoding. An audio signal generated as a result of such decoding is outputted to an unshown circuit.

The above is the operation performed when the transfer rate is a fixed one. FIG. 8 shows a timing chart of signals in the case of adopting a variable transfer rate. A high rate mode of 8 Mbps is selected in the operation before a time t3 and after a time t6, and a low rate mode of 2 Mbps is selected during a period between the times t3 and t6. The latter transfer rate is designated when the data are encoded by an unshown encoder.

In FIG. 8, a line D represents a state of writing the data in the video code buffer 6, and its inclination signifies a transfer rate. A line F represents a state of reading out the data from the video code buffer 6 by the video decoder 7. It follows, therefore, that the data within a shaded area in FIG. 8 is left in the video code buffer 6. The storage capacity of the video code buffer 6 is expressed by a distance perpendicular to the time axis extending from line D to a line E.

In the lower diagram of FIG. 8 (an enlarged view of the period from time t3 to time t6), a picture W is a subject to be noted now as an example. The data of the picture W begins to be loaded in the video code buffer 6 at the time t4, which is indicated by the timing data SCR affixed to the pack where the head G of the data of the picture W is stored. The data of the picture W begins to be decoded at a time t5, which is indicated by the timing data DTSV affixed to the packet where the head of the picture W is stored.

The input unit 29 is manipulated for instructing the control circuit 28 to start reproduction of the data from the picture W. The control circuit 8 sends a command to the drive 1, which then accesses a desired position on the optical disk incorporated therein and reproduces the recorded data. The reproduced data outputted from the drive 1 is supplied to the demodulator 2 so as to be demodulated, and the output therefrom is supplied to the ECC circuit 3 where a process of error detection and correction is executed. The data thus processed is supplied via the ring buffer 4 to the data separation circuit 21 in the data demultiplexer 5.

Data MUX_RATE is disposed at the top of each pack, so that the transfer rate of the relevant pack can be detected by referring to this data. For example, the data separation circuit 21 controls the transfer rate in accordance with the value of this data. As to control of variable rate data, an exemplary description is disclosed in U.K. Patent GB 2 259 229 A (Date of publication: Mar. 3, 1993).

The data separation circuit 21 controlled by the control circuit 28 separates the video data from the output data of the ring buffer 4 and supplies the video data to the video code buffer 6. The circuit 21 further separates the timing data into SCR and DTSV, which are then supplied to the STC register 26 and the DTSV register 22 respectively and are stored therein. Since the operation of the audio section is similar to that mentioned above, a repeated description is omitted here.

The STC register 26 having stored the reference timing data SCR therein counts the clock pulses outputted from the clock generator 27 and increments the storage value in response to the clock pulses. The storage value of the STC register 26 is supplied as a system time clock (STC) signal to the comparators 23 and 25.

The timing data SCR corresponds to the time when demultiplexing is started after supply of the data of the picture W to the data demultiplexer 5. More specifically, it corresponds to a time t4 in the timing chart of FIG. 8. Therefore, the STC register 26 outputs the timing data (current time) from the time t4 to one input terminal of each of the comparators 23 and 25.

The DTSV register 22 supplies the video timing data DTSV, which indicates the picture-W decoding start time of the video decoder 7, to the other input terminal of the comparator 23. When the current time outputted from the STC register 26 has become coincident with the decoding start time outputted from the DTSV register 22 (i.e., at a time t5 in FIG. 8), the comparator 23 outputs a video decoding start signal to the video decoder 7. In response to the video decoding start signal thus received, the video decoder 7 reads out one frame of the video data written in the video code buffer 6 and then starts its decoding.

In the conventional demultiplexer of FIG. 5, as described, the time period from SCR (t4) to DTS (t5) is controlled by counting clock pulses of a fixed frequency, and the data are written in the buffer during such time period. Consequently, the data transfer rate is fixed at one value designated on the encoder side, so that it has been impossible heretofore to shorten the start-up delay even when the data supply rate to the demultiplexer 5 is lower than the maximum transfer rate and a margin thereof is still left.

SUMMARY OF THE INVENTION

The present invention has been accomplished in view of the circumstances mentioned above and it is an object of the present invention to provide an improvement which is capable of enhancing the responsivity of the system by shortening the start-up delay.

According to a first aspect of the present invention, there is provided a data demultiplexer for separating multiplex data which includes at least first coded data such as video data, first timing data indicative of a decoding start time of the first coded data, and second timing data indicative of a system clock reference time. The demultiplexer comprises a separation means for separating the multiplex data into the first coded data, the first timing data and the second timing data; and a comparison means for comparing the time, which is indicated by the first timing data separated by the separation means, with the time indicated by the second timing data; wherein, when the time indicated by the second timing data is temporally anterior to the time indicated by the first timing data, the multiplex data is supplied at the maximum transfer rate to the separation means.

The data demultiplexer further comprises a system time clock generation means for generating a system time clock signal by setting an initial value thereof on the basis of the first timing data and then incrementing predetermined clock pulses; and a means for generating a first decoding start signal by comparing the first timing data with the system time clock signal.

The multiplex data further includes second coded data such as audio data, and third timing data indicative of a decoding start time of the second coded data. The demultiplexer further comprises a means for generating a second decoding start signal by comparing the third timing data with the system time clock signal.

According to a second aspect of the present invention, there is provided a data demultiplexer for separating multiplex data which includes at least first coded data such as video data, first timing data indicative of a decoding start time of the first coded data, second coded data such as audio data, and second timing data indicative of a decoding start time of the second coded data. The demultiplexer comprises a separation means for separating the multiplex data into the first coded data, the first timing data, the second coded data and the second timing data; and a comparison means for comparing the time, which is indicated by the first timing data separated by the separation means, with the second timing data; wherein the separation means does not supply the second coded data when the time indicated by the second timing data is temporally anterior to the time indicated by the first timing data.

According to a third aspect of the present invention, there is provided a data demultiplexing method for separating multiplex data which includes at least first coded data such as video data, first timing data indicative of a decoding start time of the first coded data, and second timing data indicative of a system clock reference time. The demultiplexing method comprises the steps of: separating the multiplex data into the first coded data, the first timing data and the second timing data; comparing the time, which is indicated by the separated first timing data, with the time indicated by the second timing data; and reading out the multiplex data from a buffer at the maximum transfer rate when the time indicated by the second timing data is temporally anterior to the time indicated by the first timing data.

The data demultiplexing method further comprises the step of generating a system time clock signal by setting an initial value thereof on the basis of the first timing data and then incrementing predetermined clock pulses.

The demultiplexing method further comprises the step of generating a decoding start signal by comparing the first timing data with the system time clock signal.

The multiplex data further includes second coded data such as audio data, and third timing data indicative of a decoding start time of the second coded data. The demultiplexing method further comprises the step of generating a second decoding start signal by comparing the third timing data with the system time clock signal.

According to a fourth aspect of the present invention, there is provided a data demultiplexing method for separating multiplex data which includes at least first coded data such as video data, first timing data indicative of a decoding start time of the first coded data, second coded data such as audio data, and second timing data indicative of a decoding start time of the second coded data. The demultiplexing method comprises the steps of: separating the multiplex data into the first timing data, the first coded data, the second coded data, and the second timing data; comparing the time, which is indicated by the separated first timing data, with the time indicated by the second timing data; and supplying none of the second coded data to a decoder when the time indicated by the second timing data is temporally anterior to the time indicated by the first timing data.

In the data demultiplexer of the constitution mentioned, the video timing data DTSV is compared with the reference data SCR by the comparison means. In accordance with the result of such comparison, the video and audio data can be inputted at a higher transfer rate designated in the bit stream, hence enhancing the responsivity at the start of reproduction.

The above and other features and advantages of the present invention will become apparent from the following description which will be given with reference to the illustrative accompanying drawings.

BRIEF DESCRIPTION OF THE DRAWINGS

FIG. 2 is a timing chart of signals for explaining the first embodiment of FIG. 1;

FIG. 8 is a timing chart of signals for explaining the operation at a variable transfer rate in the example of FIG. 5.

DESCRIPTION OF THE PREFERRED EMBODIMENTS

Hereinafter preferred embodiments of the present invention will be described in detail with reference to the accompanying drawings.

Figure 1A:
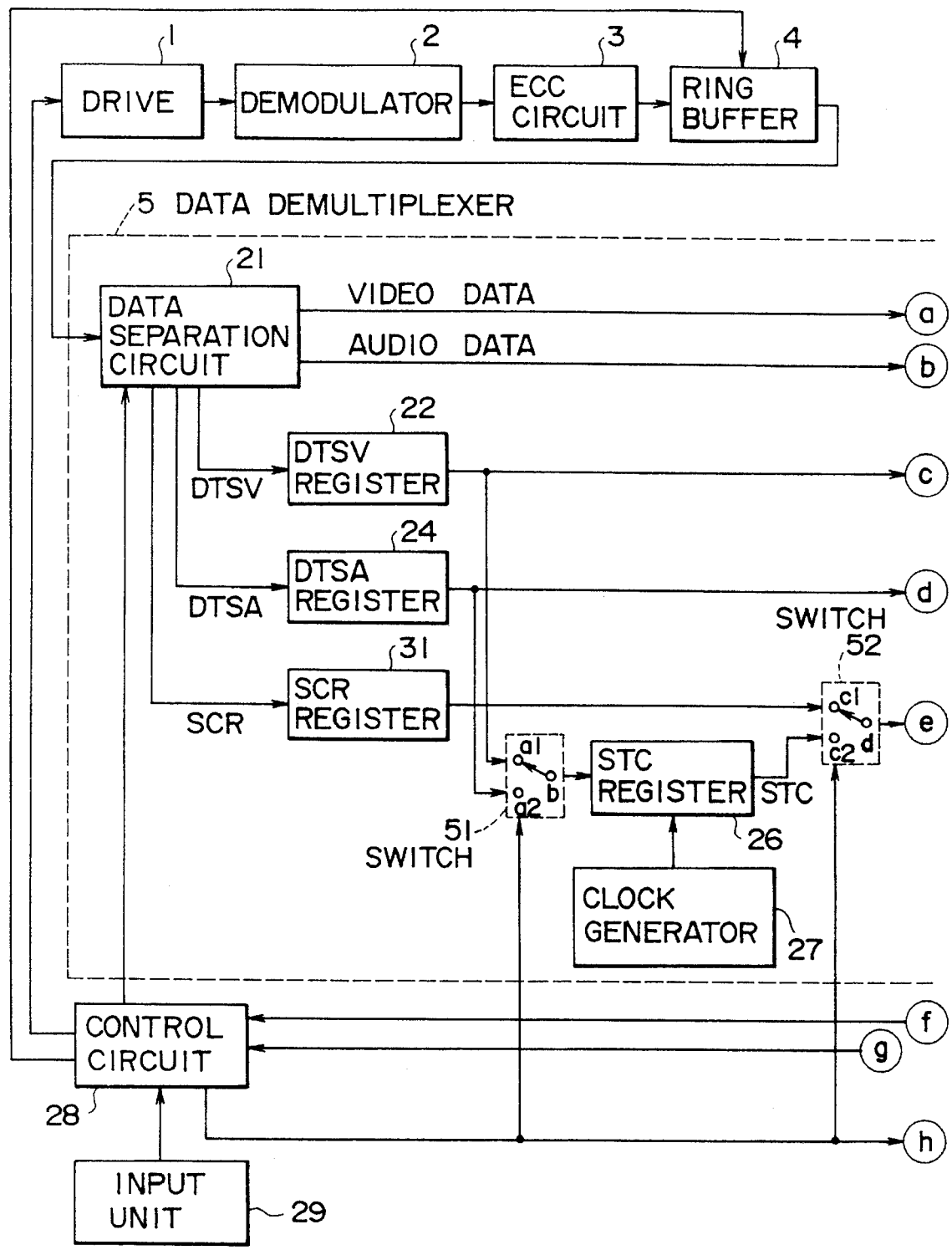
FIG. 1 is a block diagram showing an exemplary constitution of a first embodiment which represents the data demultiplexer of the present invention.
Figure 5A:
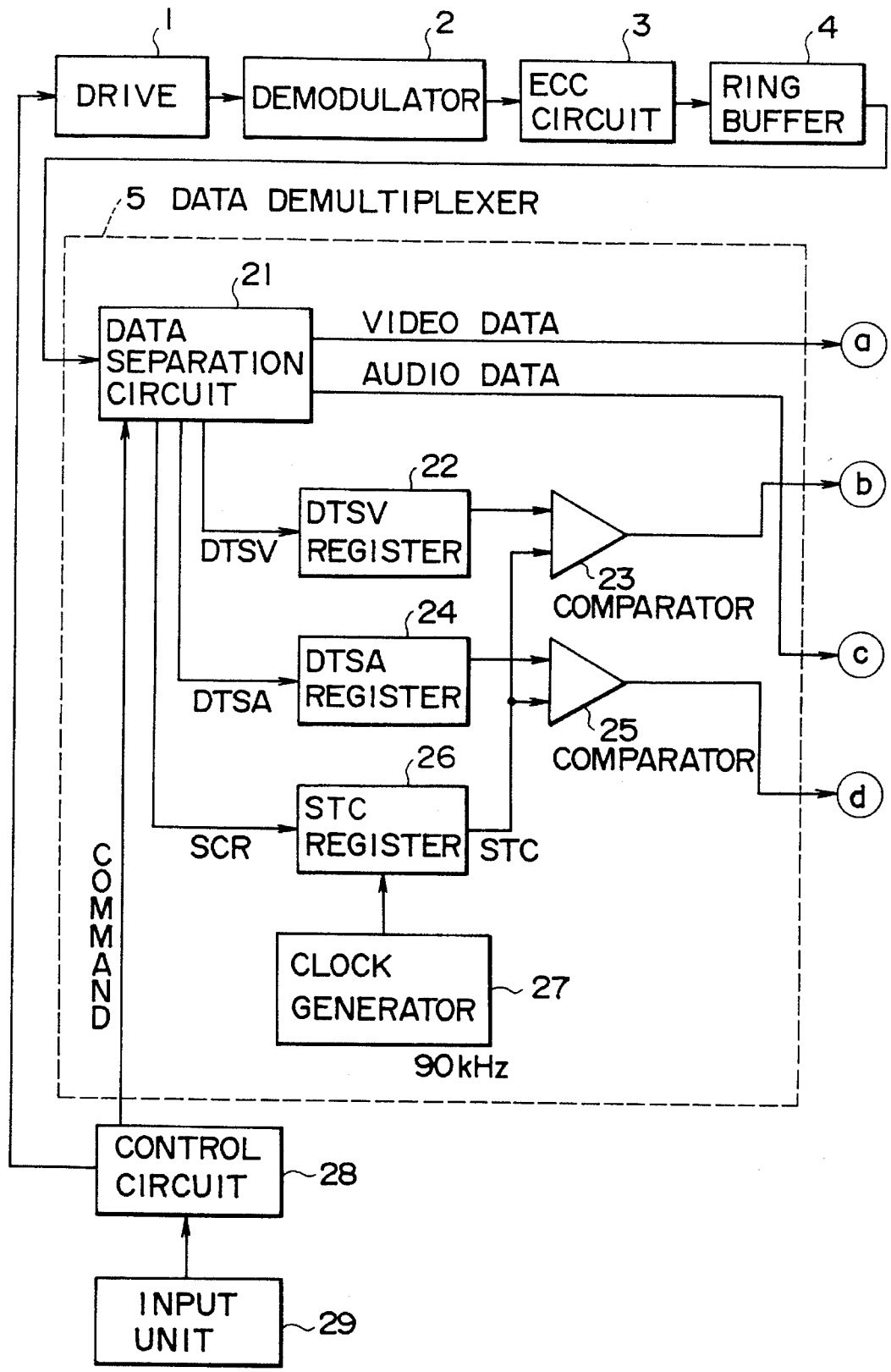
FIG. 5 is a block diagram showing an exemplary constitution of a conventional data demultiplexer in the related art.
Figure 5B:
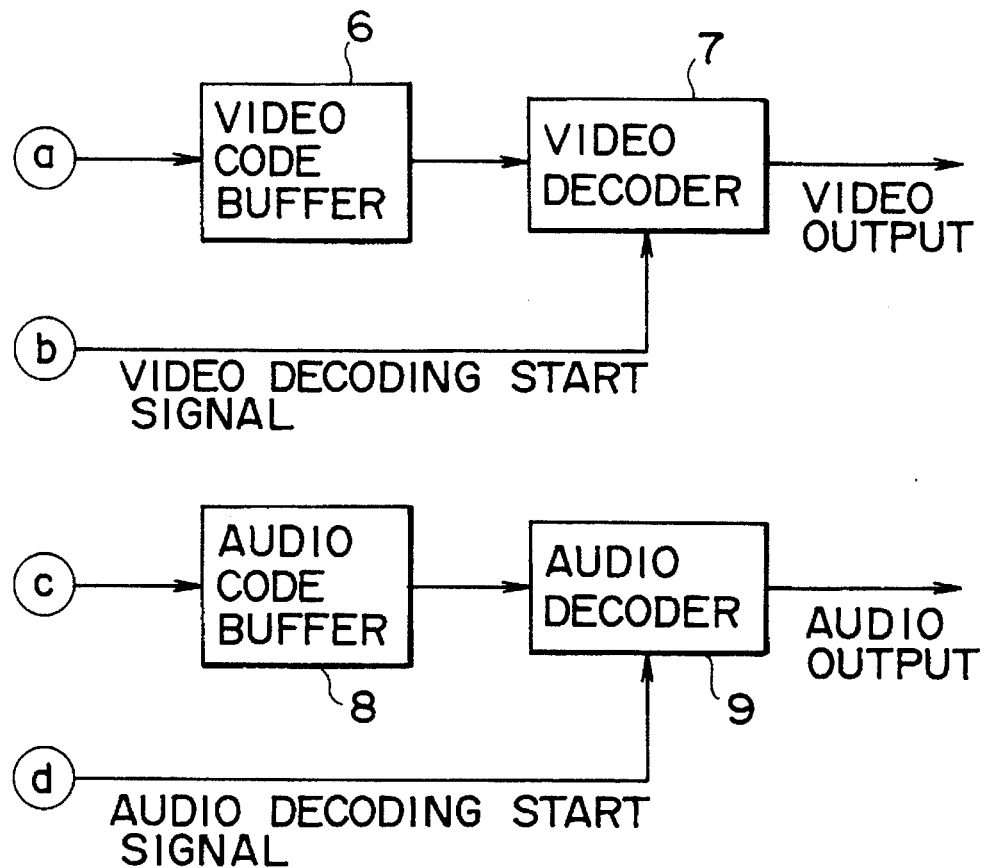
Figure 5:
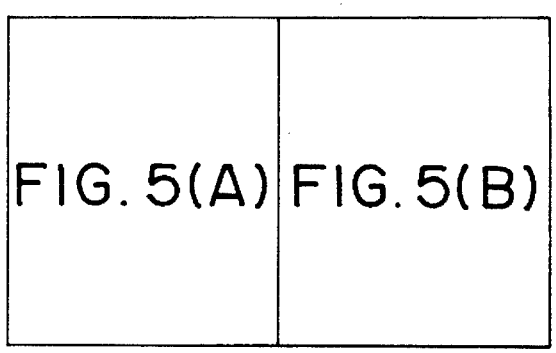
Figure 6:
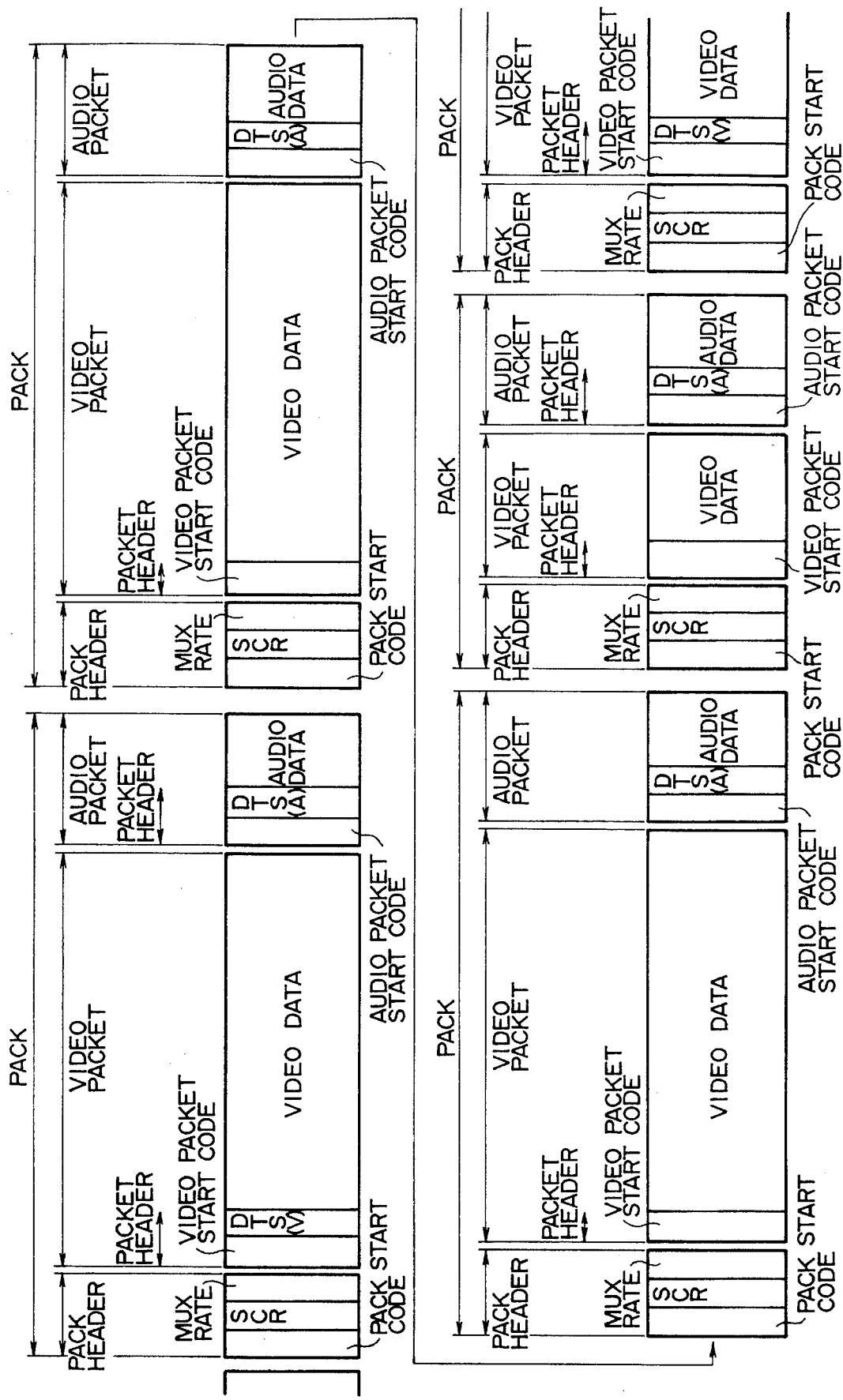
FIG. 6 is an explanatory diagram of a multiplex bit stream in the example of FIG. 5.
Figure 7:
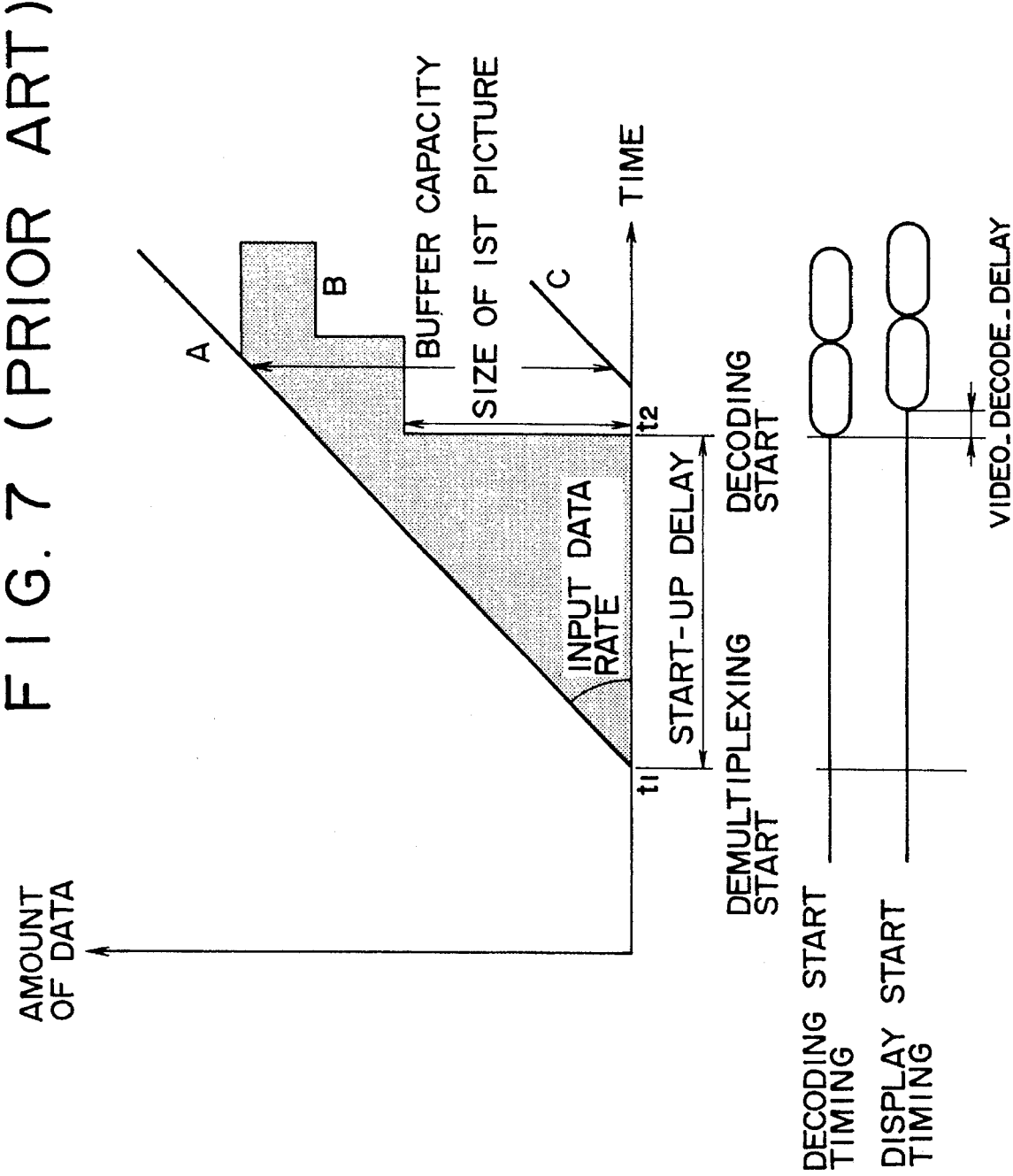
FIG. 7 is a timing chart of signals for explaining the operation of the example shown in FIG. 5.

FIG. 1 is a block diagram showing an exemplary constitution of a first embodiment which represents the data demultiplexer of the invention, wherein any like component circuits or elements corresponding to those in the aforementioned conventional example of FIG. 5 are denoted by the same reference numerals. In this first embodiment, a data demultiplexer 5 comprises a data separation circuit 21, a DTSV register 22, a DTSA register 24, comparators 23 and 25, an STC register 26, a clock generator 27, an SCR register 31, and switch circuits 51, 52, 53 and 54.

The output of the DTSV register 22 is supplied to the comparator 23 while being also supplied to one input terminal a1 of the switch circuit 51. Similarly, the output of the DTSA register 24 is supplied to the comparator 25 while being also supplied to another input terminal a2 of the switch circuit 51. The output obtained from an output terminal b of the switch circuit 51 is supplied to the STC register 26 so as to be stored therein. The STC register 26 counts clock pulses of 90 kHz produced from the clock generator 27 and increments its storage value to thereby generate a system time clock STC. The STC thus outputted from the STC register 26 is connected to an input terminal c2 of the switch circuit 52.

To the SCR register 31, there is supplied a system clock reference SCR separated as timing data by the data separation circuit 21. The output of the SCR register 31 is connected to another input terminal cl of the switch circuit 52.

An output terminal d of the switch circuit 52 is connected to another input terminal of each of the comparators 23 and 25.

The output of the comparator 23 is connected to an input terminal e of the switch circuit 53. One output terminal f1 of the switch circuit 53 is connected to a video decoder 7, while another output terminal f2 thereof is connected to a control circuit 28.

Similarly, the output of the comparator 25 is connected to an input terminal g of the switch circuit 54. One output terminal h1 of the switch circuit 54 is connected to an audio decoder 9, while another output terminal h2 thereof is connected to the control circuit 28.

The switch circuits 51, 52, 53 and 54 are controlled by the control circuit 28.

The operation of the first embodiment will now be described below. First, the input unit 29 is manipulated for instructing the control circuit 28 to start reproduction of an optical disk. In this stage, the control circuit 28 sets the data demultiplexer 5 in its initialize mode. More specifically, the switch circuit 52 is closed through the contact cl so that the output of the SCR register 31 is supplied to the comparators 23 and 25. Meanwhile, the switch circuit 53 is closed through the contact f2, and the switch circuit 54 is closed through the contact h2 so that the resultant outputs of the comparators 23 and 25 are supplied to the control circuit 28.

The data separation circuit 21 is controlled by the control circuit 28 and separates the output data of a ring buffer 4 into video data and audio data, which are then supplied to a video code buffer 6 and an audio code buffer 8, respectively. The circuit 21 further separates the timing data into SCR, DTSV and DTSA, which are then supplied to the SCR register 31, the DTSV register 22 and the DTSA register 24, respectively so as to be stored therein.

The SCR register 31 stores the latest one of the reference timing data SCR supplied thereto successively and outputs the stored data therefrom. The DTSV register 22 holds the video timing data DTSV supplied first thereto after the start of reproduction. Consequently, the DTSV register 22 comes to have a decoding start time relative to a top picture out of the entire data stored in the video code buffer 6.

Similarly, the DTSA register 24 holds the audio timing data DTSA supplied first thereto after the start of reproduction. Consequently, the register 24 comes to have a decoding start time relative to a top decode unit out of the entire data stored in the audio code buffer 8.

The switch circuit 52 is closed through the contact cl in response to a command from the control circuit 28, so that the outputs of the DTSV register 22, the DTSA register 24 and the SCR register 31 are supplied respectively to the comparators 23 and 25.

Figure 3:
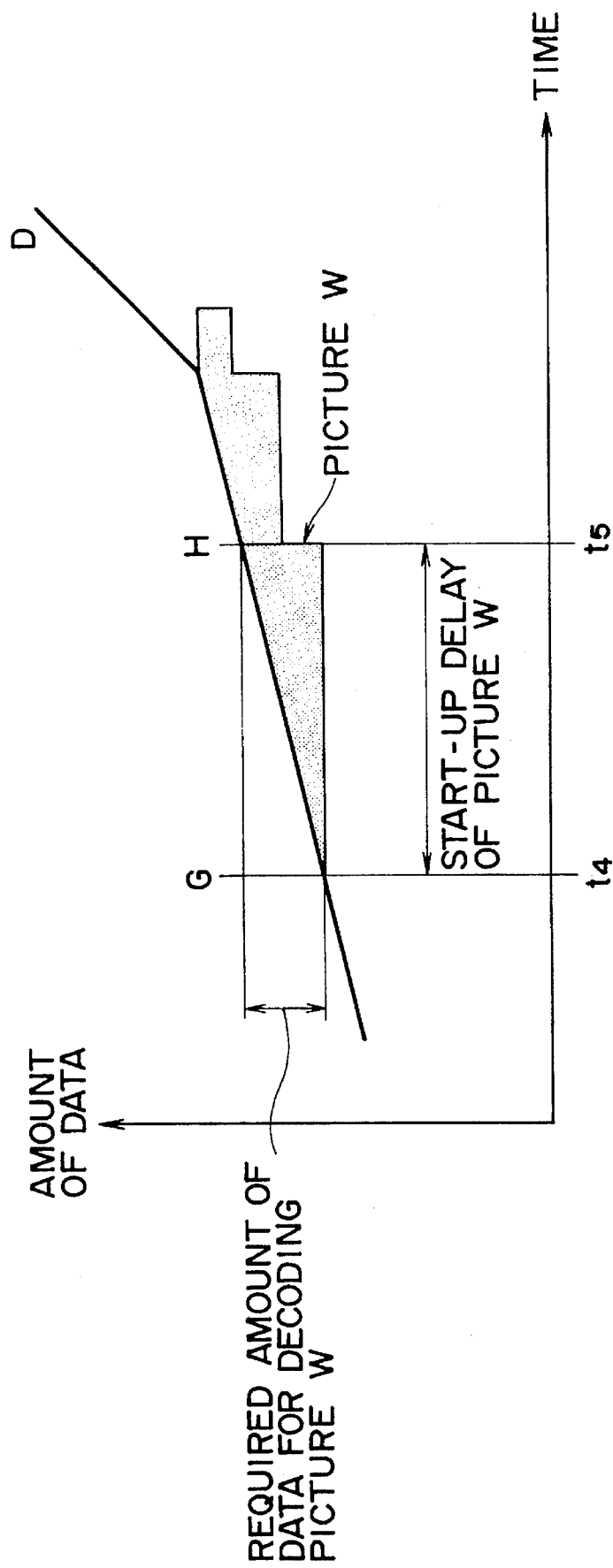
FIG. 3 is a conventional timing chart of signals for comparison with FIG. 2.

Now a start of reproduction from a picture W and a flow of the data will be described below with reference to FIGS. 2 and 3. For comparison, FIG. 3 shows the timing explained in connection with the conventional example of the related art.

In response to a command received from the input unit 29 for a start of reproduction, the control circuit 28 sends a command to the drive 1 to perform reproduction, so that the data is reproduced from the optical disk incorporated in the drive and is supplied to the demodulator 2 to be thereby demodulated. The data thus demodulated is supplied to the ECC circuit 3 where a process of error detection and correction is executed, and subsequently the processed data is supplied via the ring buffer 4 to the data separation circuit 21.

Assume here that, at a time t7 in FIG. 2 (time t4 in FIG. 3), the first data including a picture W is supplied from the ring buffer 4 to the data separation circuit 21. The video data beginning with the picture W is supplied to the video code buffer 6, while the multiplex audio data is supplied to the audio code buffer 8 simultaneously.

The video timing data DTSV indicating a picture-W decoding start time is separated by the data separation circuit 21 and is supplied to the DTSV register 22, which then holds the DTSV of the picture W and outputs the same therefrom. Since the picture-W decoding start time is t8 in FIG. 2 (time t5 in FIG. 3), its value is held in the DTSV register 22 and then is fed to one input terminal of the comparator 23.

Similarly, the DTSA register 24 holds the audio timing data DTSA supplied thereto first, and then outputs the same therefrom.

It is supposed in this embodiment that the video timing data DTSV has a smaller value than the audio timing data DTSA (i.e., the video data begins to be decoded temporally anterior to the audio data).

The reference timing data SCR recorded at the top of each pack is supplied to the SCR register 31. The SCR register 31 holds the latest one of the data SCR supplied thereto successively and then outputs the same therefrom. Since the first pack of the picture W is supplied at a time t7 (time t4 in FIG. 3), the reference timing data SCR supplied to the SCR register 31 starts at t7 (t4 in FIG. 3).

Immediately after initial supply of the data (J=t7 in FIG. 2), the output of the SCR register 31 is smaller than the output of the DTSV register 22. The control circuit 28 monitors the output of the comparator 23 and supplies the data from the ring buffer 4 at the maximum rate to the data separation circuit 21 during the period in which the output of the comparator 23 signifies the above relation between the outputs of the SCR register 31 and the DTSV register 22. As obvious from a comparison between FIGS. 2 and 3, the transfer rate of the data inputted to the data separation circuit 21 (i.e., to the video code buffer 6) at the time t7 (t4) is higher in FIG. 2 than in FIG. 3.

Upon arrival at t8 (i.e., at t5 in FIG. 3) after a lapse of the time (with advance of writing in the video code buffer 6), the data required for decoding the picture W is written in the video code buffer 6, so that the reference time data SCR supplied thereafter becomes greater than the video timing data DTSV for the picture W. In this stage, the comparator 23, which is comparing the output of the DTSV register 22 with the output of the SCR register 31, informs the control circuit 28 that the value of the SCR register 31 has become greater than the value of the DTSV register 22.

Then a the control circuit 28 sets the data demultiplexer 5 in its decode mode. Subsequently the data demultiplexer 5 interrupts its operation of inputting the data from the ring buffer 4 and changes the internal state in such a manner that the switch circuit 51 is closed through the contact al and the output (t8) of the DTSV register 22 is inputted and held in the STC register 26. Thereafter the switch circuit 52 is closed through the contact c2, and the output (t8) of the STC register 26 is supplied to the comparators 23 and 25.

The switch circuit 53 is closed through the contact f1 while another switch circuit 54 is closed through the contact h1, so that the outputs of the comparators 23 and 25 are fed to the video decoder 7 and the audio decoder 9, respectively.

After such change of the internal state, the data demultiplexer 5 resumes its operation of inputting the data, and simultaneously therewith, the STC register 26 starts its count (increment) at the time t8. The comparator 23 compares the output DTSV of the DTSV register 22 (t8 in this stage) with the count value STC of the STC register 26 (which increases successively from t8). When the result of such comparison signifies that the STC is equal to or greater than the DTSV, a video decoding start signal is generated and outputted to the video decoder 7, which then starts decoding the video data.

Similarly, the comparator 25 compares the output of the DTSA register 24 with the output of the STC register 26. When the result of such comparison signifies that the STC is equal to or greater than the DTSA, an audio decoding start signal is generated and outputted to the audio decoder 9, which then starts decoding the audio data.

In the embodiment mentioned above, it is defined that the video decoding start time (DTSV) is temporally earlier than the audio decoding start time (DTSA). However, the same operation can be performed if the DTSA is earlier to the contrary.

Although in the above embodiment the timing data DTSV and DTSA are used to indicate the video and audio decoding start times, it is also possible to employ another timing data PTS (presentation time stamp). This PTS is disposed in packet headers of partial packets, and its value indicates the time when the portion beginning with the first access unit in the relevant packet is to be displayed. In the audio data, the PTS and the DTS have the same value so as to be interchangeable by a simple calculation in the video data as well.

In the conventional apparatus, as described above, the time period from the SCR to the DTS is calculated by counting clock pulses of a fixed frequency, and the data is written in the video code buffer 6 during such time period. Consequently, the data transfer rate is determined by the clock frequency to be eventually rendered low.

However, in the above embodiment of the present invention, the data can be written in the video code buffer 6 at the maximum transfer rate when the DTS of a desired picture is inputted, then the SCR of the data stored in the buffer 6 is compared with the DTS successively, and a decision is made, on the basis of the result of such comparison, as to whether a required amount of the data for decoding the relevant picture has been written or not (whether the elapse has arrived at the decoding start time or not), whereby a fast response can be achieved.

Furthermore, when it is necessary to synchronize the system with a video synchronizing signal, the purpose is attainable by the following method in case the video decoding start time has a priority over any other decoding start time (e.g., audio decoding start time).

Figure 4A:
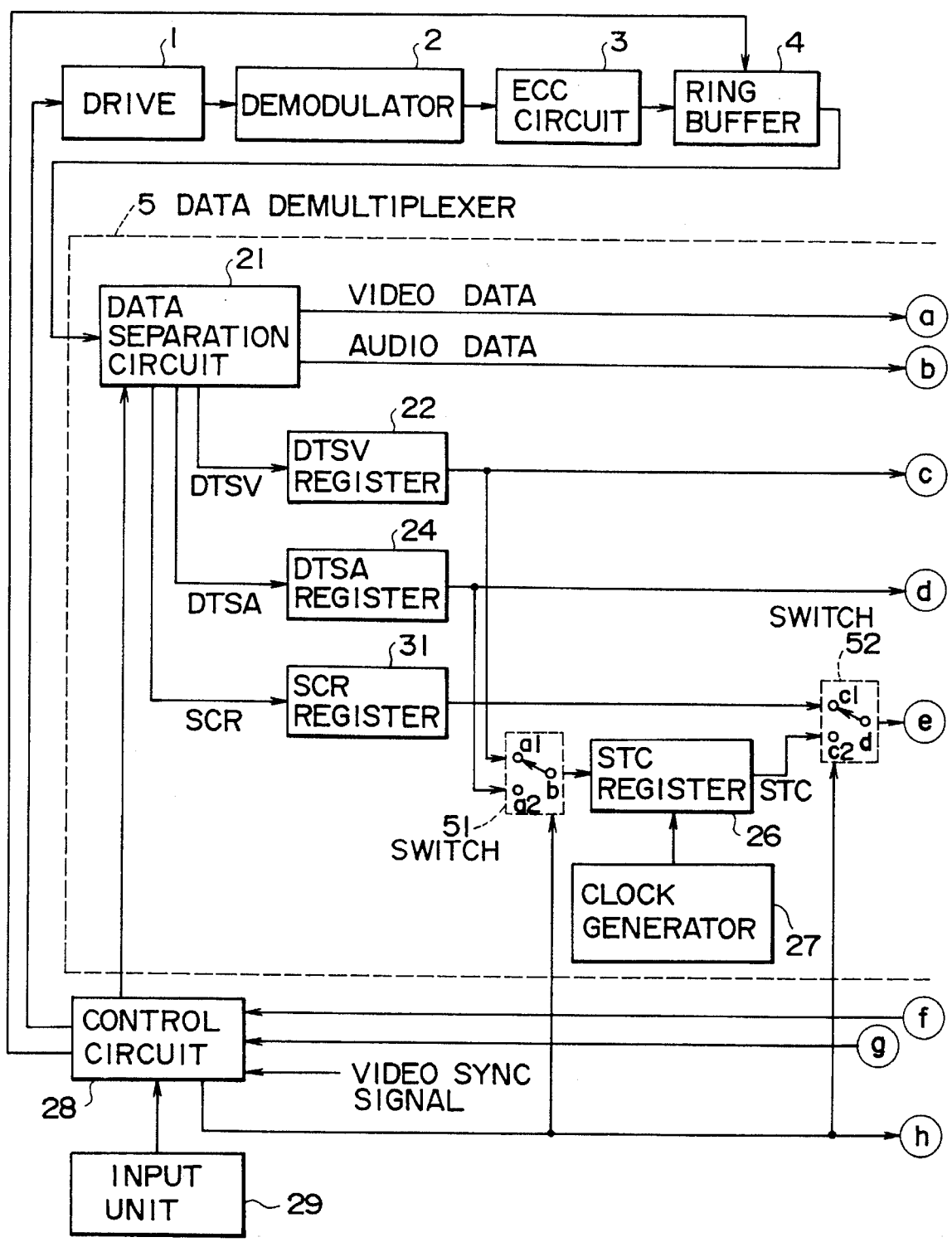
FIG. 4 is a block diagram showing an exemplary constitution of a second embodiment which represents the data demultiplexer of the invention.

FIG. 4 is a block diagram showing an exemplary constitution of a second embodiment which represents the data demultiplexer of the present invention, wherein any component circuits or elements corresponding to those used in FIG. 1 are denoted by the same reference numerals. In this second embodiment, timing data DTSV and DTSA separated by a data separation circuit 21 are inputted to a DTSV register 22 and a DTSA register 24, respectively, while being inputted also to a control circuit 28, and simultaneously, a video synchronizing signal is inputted to the control circuit 28. Any other construction is the same as that of the foregoing first embodiment shown in FIG. 1.

Hereinafter the operation of the second embodiment will be described. First, an input unit 29 is manipulated for instructing the control circuit 28 to start reproduction. Then, the control circuit 28 sets the data demultiplexer 5 in its initialize mode.

Now a start of reproduction from a picture W and a flow of the data will be described below with reference to FIG. 2.

Assume here that, at a time t7 in FIG. 2, the first data including a picture W is supplied from the ring buffer 4 to the data separation circuit 21. The video data beginning with the picture W is supplied to the video code buffer 6. Since the video data has a higher priority (to be described), the audio data is ignored in the earliest period. More specifically, none of the audio data is supplied from the data separation circuit 21 to the audio code buffer 8.

The video timing data DTSV indicating a decoding start time of the picture W is separated by the data separation circuit 21 and is supplied to both the DTSV register 22 and the control circuit 28. The DTSV register 22 holds the DTSV of the picture W and then outputs the same therefrom. Since the picture-W decoding start time is t8 in this example, its value is held in the DTSV register 22 and is fed to one input terminal of the comparator 23. The control circuit 28 holds this video timing data DTSV (t8) therein.

Similarly, audio timing data DTSA is separated by the data separation circuit 21 and is supplied to both the DTSA register 24 and the control circuit 28. Then, the control circuit 28 compares the input audio timing data DTSA with the video timing data DTSV and, when the result of such comparison signifies that the data DTSA is smaller (i.e. the video data has a higher priority), the control circuit 28 controls the DTSA register 24 in such a manner as to ignore the timing data DTSA (i.e., not to hold the same in the DTSA register 24). Such operation of ignoring the timing data DTSA is performed also when the data DTSA is inputted to the control circuit 28 anterior to the data DTSV. To the contrary, when the timing data DTSA is greater than (temporally posterior to) the timing data DTSV held in the register 22, the control circuit 28 instructs the DTSA register 24 to hold and output the data DTSA. The control circuit 28 further instructs the data separation circuit 21 to supply the separated audio data to the audio code buffer 8.

The reference timing data SCR recorded at the top of each pack is supplied to the SCR register 31. Then the SCR register 31 holds the latest one of the data SCR supplied thereto successively and outputs the same therefrom. Since the pack of the picture W is supplied at the time t7, the reference timing data SCR supplied to the SCR register 31 starts at t7.

Immediately after initial supply of the data (J=t7 in FIG. 2), the output of the SCR register 31 is smaller than the output of the DTSV register 22 (at t8). The control circuit 28 supplies the data from the ring buffer 4 at the maximum transfer rate to the data separation circuit 21 during the period in which the outputs of the two registers 31 and 22 have the above relationship therebetween.

Upon arrival at t8 after a lapse of the time, the reference timing data SCR becomes greater than the video timing data DTSV of the picture W. In this stage of the operation, the comparator 23, which is comparing the output of the DTSV register 22 with the output of the SCR register 31, informs the control circuit 28 that the value of the SCR register 31 has become greater.

Then the control circuit 28 sets the data demultiplexer 5 in its decode mode, whereby the internal state is switched in the same manner as in the aforementioned first embodiment of FIG. 1.

For the purpose of synchronizing the video decoder 7 with a video synchronizing signal, the control circuit 28 performs the following operation in synchronism with the video synchronizing signal inputted thereto. First the control circuit 28 enables the data demultiplexer 5 to resume its operation of inputting the data in synchronism with the video synchronizing signal. Simultaneously the STC register 26 starts its count (increment) and then generates and sends a video decoding start signal to the video decoder 7 as described above.

Further, the comparator 25 compares the output of the DTSA register 24 with the output of the STC register 26, and generates and sends a decoding start signal to the audio decoder 9 when the result of such comparison signifies that the STC is equal to or greater than the DTSA.

Although in this embodiment the video decoder 7 serves as a main while the audio decoder 9 as a subsidiary, it is still possible to achieve the same operation regardless of whether either decoder serves as a main, and it is obvious that the same desired result can be attained even if a plurality of kinds of subsidiary decoders or a plurality of main and subsidiary ones are employed.

In each of the two embodiments mentioned, the comparators 23 and 25 are controlled so as to keep performing the respective comparisons. However, the circuit configuration may be modified so that each comparison is executed after effective data is inputted to the DTSV register 22 or the DTSA register 24, whereby an accurate operation can be ensured.

As described hereinabove, according to the data demultiplexer of the present invention, timing data indicative of a decoding start time and timing data indicative of a reference time are compared with each other, and in conformity with the result of such comparison, the video and audio data can be inputted at a higher transfer rate designated in the bit stream, hence enhancing the responsivity at the start of reproduction.

What is claimed is:

1. A data demultiplexer for separating multiplex data which includes at least first coded data, first timing data indicative of a decoding start time of the first coded data, and second timing data indicative of a system clock reference time, said demultiplexer comprising:

separation means for separating the multiplex data into the first coded data, the first timing data and the second timing data;

comparison means coupled to said separation means for comparing the time indicated by the separated first timing data with the time indicated by the separated second timing data; and means for supplying said multiplex data to said separation means at a variable transfer rate, said means for supplying being operable to supply the multiplex data to said separation means at a maximum transfer rate when the time indicated by the second timing data is temporally anterior to the time indicated by the first timing data.

2. The data demultiplexer according to claim 1, wherein said first coded data is coded video data.

3. The data demultiplexer according to claim 1, further comprising means coupled to said separation means for generating a system time clock signal by setting an initial value thereof on the basis of the first timing data and then incrementing said system time clock signal at predetermined clock pulses.

4. The data demultiplexer according to claim 3, further comprising means coupled to said separation means and coupled to said means for generating said system time clock signal for generating a first decoding start signal by comparing the first timing data with the system time clock signal.

5. The data demultiplexer according to claim 3, wherein the multiplex data further includes second coded data, and third timing data indicative of a decoding start time of the second coded data, and said separation means is further operable to separate the multiplex data into said second coded data and said third timing data; and said demultiplexer further comprises means coupled to said separation means and coupled to said means for generating said system time clock signal for generating a second decoding start signal by comparing the separated third timing data with the system time clock signal.

6. A data multiplexer according to claim 5, wherein said second coded data is coded audio data.

7. A data demultiplexer for separating multiplex data which includes at least first coded data, first timing data indicative of a decoding start time of the first coded data, second coded data, and second timing data indicative of a decoding start time of the second coded data, said demultiplexer comprising:

separation means for separating the multiplex data into the first coded data, the first timing data, the second coded data and the second timing data; and comparison means coupled to said separation means for comparing the time indicated by the separated first timing data with the time indicated by the separated second timing data;

wherein said separation means does not supply the second coded data when the time indicated by the second timing data is temporally anterior to the time indicated by the first timing data.

8. The data demultiplexer according to claim 7, wherein said first coded data is coded video data, and said second coded data is coded audio data.

9. A data demultiplexing method for separating multiplex data which includes at least first coded data, first timing data indicative of a decoding start time of the first coded data, and second timing data indicative of a system clock reference time, said method comprising the steps of:

separating the multiplex data into the first coded data, the first timing data and the second timing data;

comparing the time indicated by the separated first timing data with the time indicated by the separated second timing data; and reading out the multiplex data from a buffer and supplying the read out data to the separator at a variable transfer rate, said read out multiplex data being supplied at a maximum transfer rate when the time indicated by the second timing data is temporally anterior to the time indicated by the first timing data.

10. The data demultiplexing method according to claim 9, wherein said first coded data is coded video data.

11. The data demultiplexing method according to claim 9, further comprising the step of generating a system time clock signal by setting an initial value thereof on the basis of the first timing data and then incrementing said system time clock signal at predetermined clock pulses.

12. The data demultiplexing method according to claim 11, further comprising the step of generating a first decoding start signal be comparing the first timing data with the system time clock signal.

13. The data demultiplexing method according to claim 11, wherein said multiplex data further includes second coded data, and the third timing data indicative of a decoding start time of the second coded data, and said step of separating the multiplex data includes separating the multiplex data into said second coded data and said third timing data; and said demultiplexing method further comprises the step of generating a second decoding start time by comparing the separated third timing data with the system time clock signal.

14. The data demultiplexing method according to claim 13, wherein said second coded data is coded audio data.

15. A data demultiplexing method for separating multiplex data which includes at least first coded data, first timing data indicative of a decoding start time of the first coded data, second coded data, and a second timing data indicative of a decoding start time of the second coded data, said demultiplexing method comprising the steps of:

separating the multiplex data into the first timing data, the first coded data, the second coded data, and the second timing data;

comparing the time indicated by the separated first timing data with the time indicated by the separated second timing data; and supplying none of the second coded data to a decoder when the time indicated by the second timing data is temporally anterior to the time indicated by the first timing data.

16. The data demultiplexing method according to claim 15, wherein said first coded data is coded video data, and said second coded data is coded audio data.

* * * * *